United States Patent [19]

Murphy

[11] E Patent Number: Re. 32,554

[45] Reissued Date of Patent: Dec. 8, 1987

[54] VENT STRUCTURE

[75] Inventor: Dennis E. Murphy, Costa Mesa, Calif.

[73] Assignee: McDonnell Douglas Corporation, Long Beach, Calif.

[21] Appl. No.: 849,086

[22] Filed: Nov. 7, 1977

Related U.S. Patent Documents

Reissue of:

[64] Patent No.: 4,033,247
Issued: Jul. 5, 1977
Appl. No.: 641,429
Filed: Dec. 17, 1975

[51] Int. Cl.[4] ..... B64D 13/04

[52] U.S. Cl. ..... 244/118.5; 98/119; 98/1.5; 244/129.1

[58] Field of Search ..... 244/117 R, 118.1–118.6, 244/119, 129.1, 129.4, 129.5; 98/1.5, 119, 2.18, 74, 77, 79, 95; 251/73; 137/467, 513.3, 527; 49/31, 141; 52/1

[56] References Cited

U.S. PATENT DOCUMENTS

| | | | |
|---|---|---|---|
| 789,627 | 5/1905 | Pullman | 98/74 |
| 2,194,878 | 3/1940 | Tracy | 98/119 |
| 2,201,837 | 5/1940 | Schanck et al. | 137/467 |
| 2,441,089 | 5/1948 | Teague | 98/1.5 |
| 2,497,860 | 2/1950 | Brown | 251/73 |
| 2,515,639 | 7/1950 | Draney | 244/118.5 |
| 2,925,050 | 2/1960 | Candlin, Jr. et al. | 244/119 |
| 3,057,288 | 10/1962 | Papsdorf | 98/119 |
| 3,163,383 | 12/1964 | Starling et al. | 244/129.4 |
| 3,412,755 | 11/1968 | Mason . | |
| 3,571,977 | 3/1971 | Abeel | 244/129.1 |

OTHER PUBLICATIONS

"DC-10 Cabin Design Being Modified", Aviation Week and Space Technology, Nov. 4, 1974, p. 27.

*Primary Examiner*—Galen Barefoot
*Attorney, Agent, or Firm*—Oblon, Fisher, Spivak, McClelland & Maier

[57] ABSTRACT

A vent structure for equalizing the pressure on opposite sides of a structure including a plenum formed at least in part by movable vent panel and a hinged panel supporting wall having overcenter biasing means, the plenum being pneumatically connected to the side of the structure which will be the high pressure side so that the condition requiring venting applies a differential pressure across the hinged wall which tends to force it overcenter against the overcenter biasing means thereby removing the normal support from the vent panel which moves to open a vent passageway. Spring-loaded flapper doors may be included in the plenum forming structure to enable relief of pressure in the opposite direction.

84 Claims, 4 Drawing Figures

VENT STRUCTURE

Matter enclosed in heavy brackets [ ] appears in the original patent but forms no part of this reissue specification; matter printed in italics indicates the additions made by reissue.

BACKGROUND OF THE INVENTION

There are many cases where it is desired to control the flow of mediums, such as air, from one portion of a structure to another by restricting the flow thereof, yet provide means to reduce the restriction of flow during emergency conditions such as those which might otherwise produce enough force to fail the intervening structure. An example of this is in the floor of a wide-bodied aircraft wherein the relatively large volume of the cabin space above the floor must be vented to the space underneath the cabin floor when the underfloor volume is rapidly decompressed. If improperly vented, the relatively small differential pressure which can be developed across the cabin floor multiplied by the relatively large floor area can generate sufficient force to fail the floor and do structural damage to the aircraft. This problem has been recently recognized by governmental agencies who have promulgated regulations requiring means in aircraft to assure that a decompression in any compartment in an aircraft caused by a hole of at least 20 square feet can be safely accommodated. An obvious expedient to meet the requirement in such aircraft is to reinforce the floor so that it can withstand decompression loads structurally. However, such a solution is impractical in that it requires extensive retrofit of aircraft presently in service and increases the weight of the aircraft without a corresponding increase in efficiency, thus raising the overall cost of the aircraft to fly.

The prior art solution of providing simple blow-out panels cannot be used in most instances because their operation can be triggered by passenger applied forces. Another solution to the problem can be seen in a patent application by Robert G. McIntyre and Otto J. Minnich entitled "Frangible Aircraft Floor," U.S. Pat. Ser. No. 578,479 now U.S. Pat. No. 3,938,764 which was filed 19 May 1975, and is assigned to applicants' assignee. It has been used to provide venting through a floor structure without decreasing the useful load-carrying capacity of the aircraft. However, frangible floors cannot be used in all applications and, therefore, variable area vents which actuate automatically and are resistant to the tampering of passengers have been required.

BRIEF DESCRIPTION OF THE INVENTION

The present invention includes a hingedly mounted vent panel which normally restricts the flow of air between the upper and lower portions of an aircraft fuselage. The restriction is required so that the ventilating, air conditioning and heating air flows of the aircraft can be controlled throughout the cabin. The hinged vent panel is retained in its normal position by a pair of hinged plates which are biased overcenter against stops and form one wall of a differential pressure sensing plenum chamber. Assuming that the upper portion of the aircraft fuselage is larger than the lower portion, the plenum chamber is pneumatically connected to remain at the pressure of the upper portion. When a rapid decrease in pressure occurs below the floor, a differential pressure is generated across the two hinged plates which causes them to move against the biasing means overcenter to release the support for the vent panel which then swings out of the way to a position which no longer restricts flow between the upper and lower portions of the aircraft fuselage. Once the emergency condition is over, the vent panel is pulled toward its original position until the biasing means snaps the hinged plates back into their vent panel supporting position.

Normal venting between the upper and lower portions of the cabin can occur through openings in the vent panel which are located below the hinged plates and these can also be used to relieve a differential pressure condition wherein the low pressure side is the upper portion of the fuselage. However, in some instances the air conditioning, heating and ventilating requirements are such that the restriction is so great that an unwanted differential pressure in the opposite direction can build up across the floor. For this reason flapper doors can be included in the hinged plates which blow upwardly during decompression of the upper portion of the fuselage to allow relief of the differential pressure without damage to the floor. This is normally not a critical situation, however, since the volume above the floor of a passenger aircraft is normally much greater than the volume below it.

It is therefore a principal object of the present invention to provide means for relieving differential pressures which may be undesirably applied across a structural wall or floor structure.

Another object is to provide venting means which automatically respond to predetermined differential pressure to open a larger-than-normal venting area for relieving a differential pressure.

Another object is to provide vent means which are economical to manufacture, easy to install, tamperproof and easy to reset after their use.

Another object is to provide vent means for an aircraft which blend in with the general decor of the aircraft and therefore do not unnecessarily alarm passengers.

Another object is to provide a vent structure which, upon application of a predetermined differential pressure, self actuates to open a large vent passageway.

Another object is to provide an emergency venting structure which opens in response to a sensed differential pressure but not in response to externally applied force.

These and other objects and advantages of the present invention will become apparent to those skilled in the art after considering the following detailed specification which discloses a preferred embodiment thereof in conjunction with the accompanying drawings wherein:

DESCRIPTION OF THE SHOWN EMBODIMENT

Figure 1:
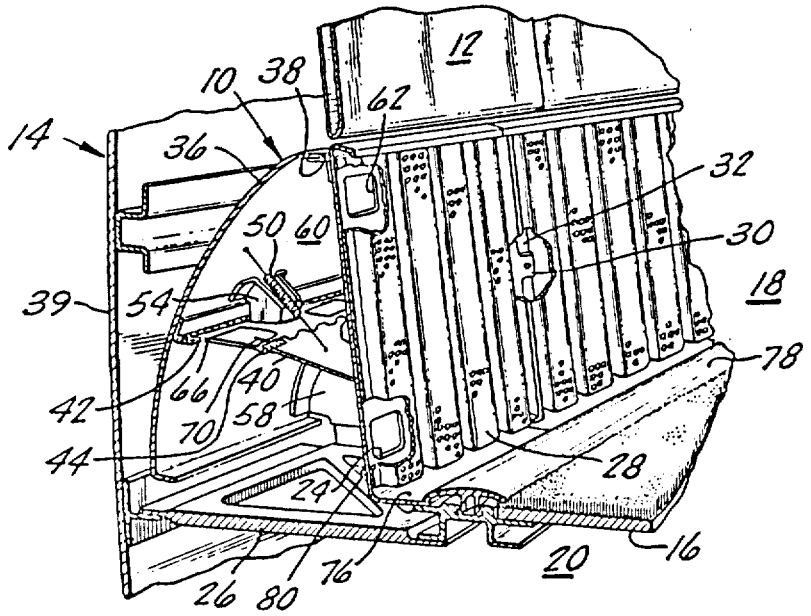
FIG. 1 is a cutaway perspective view of a portion of the side wall of an aircraft having the vent structure of the present invention installed therein.

Referring to the drawings more particularly by reference numbers, number 10 in FIG. 1 refers to a vent structure 10 installed in the interior wall 12 of an aircraft fuselage 14 adjacent the passenger compartment floor 16 which normally divides the upper fuselage volume 18 from the lower fuselage volume 20. The vent structure 10 is shown positioned and pneumatically connected for the case where the upper portion space 18 is larger than the lower portion space 20. Should the opposite be the case, the vent structure 10 could just as easily be installed below the floor 16 to protect the floor 16 from differential pressures thereacross with the high pressure being in the space 20. The normal case, however, is for the space 18 to be larger than the space 20 and therefore protection must be provided to prevent differential pressure across the floor 16 with the high pressure in the space 18 due to a rupture of the fuselage integrity below the floor 16.

Air conditioning, heating, and ventilating needs in most aircraft require that restricted flow occurs throughout the passenger compartment or upper fuselage space 18 during the flight. Therefore, the vent structure includes a vent panel 22 which may include small vent orifices 24 to allow a selected quantity of air to pass therethrough and through suitably open floor members 26 hidden therebehind. The vent orifices 24 are usually covered by decorative means such as the grille 28 shown.

Figure 2:
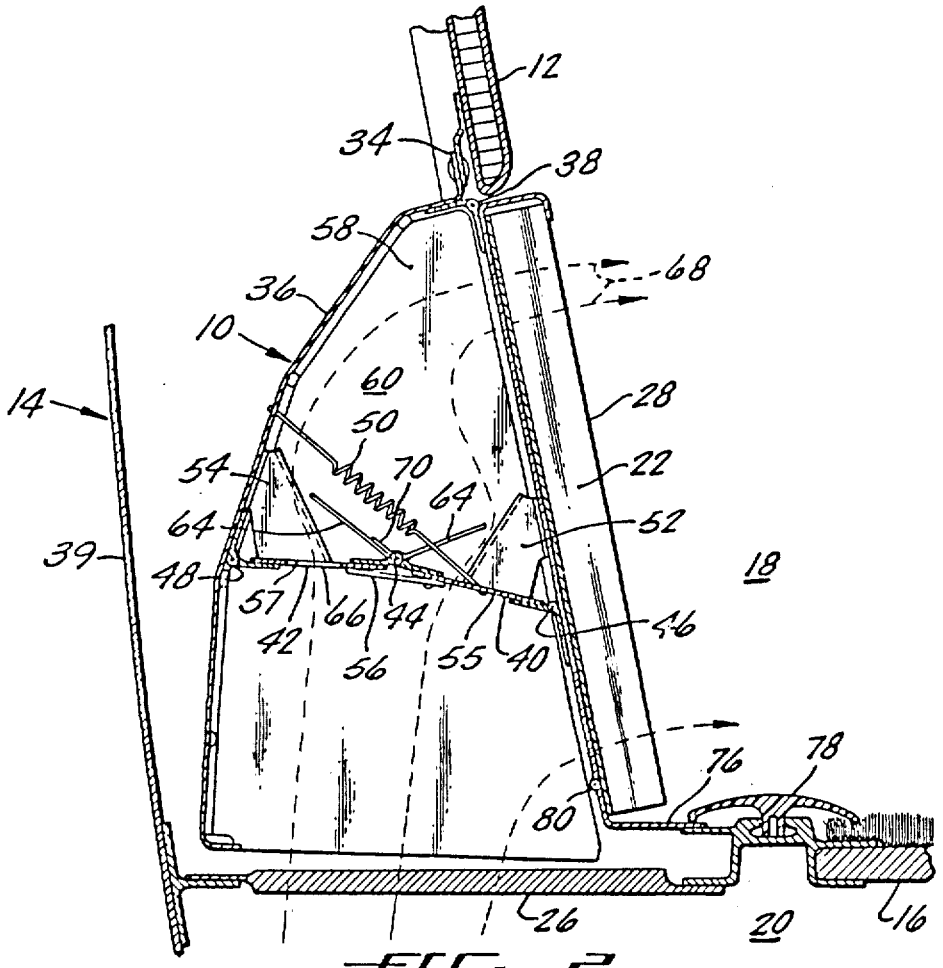
FIG. 2 is a side cross-sectional view of the vent structure of FIG. 1 showing its position when it is called upon to vent large amounts of air from the lower portion of the aircraft fuselage to the upper portion.

The vent structure 10 can be connected to the structure of the aircraft by any suitable means such as structural side extensions 30 which connect to adjacent structure 32 or by upwardly extending extensions 34 such as are shown in FIG. 2 which connect the structure 10 to the interior wall 12. Any other suitable connection means can also be used.

The vent panel 22 is connected to a shell member 36 by means of a piano-type hinge 38 which allows the vent panel 22 to swing back forward fuselage wall 39. The rotation of the vent panel 22 about the hinge 38 is normally prevented by a pair of plates 40 and 42 which are connected together by a piano-type hinge 44. In addition, plate 40 is connected to the vent panel by means of the piano hinge 46 and the plate 42 is connected to the shell 36 by means of another piano hinge 48. Suitable biasing means such as the spring 50 urge the plates 40 and 42 toward vent stops which may be the separate stops 52 and 54 connected respectively to the vent panel 22 and the shell 36, or the stop member 56. The stop member is shown connected to plate 40 in position to bear against plate 42 to prevent further movement of the plates 40 and 42 in the direction caused by the biasing spring 50 when the structure 10 is in the position shown in FIG. 2. This, of course, is also accomplished by the stops 52 and 54 which bear against plates 40 and 42 respectively with included abutment surfaces 55 and 57.

The plates 40 and 42, the shell 36, the portion of the vent panel 22 above hinge 46 and the opposite side walls such as the side wall 58 shown form a plenum chamber 60. The formulation of the plenum chamber 60 may be assisted by suitable seals incorporated into the edges of the plates 40 and 42 and the panel 22 or by providing a suitable resilient sealing material 61 on the sidewalls 58. The plenum chamber 60 is pneumatically connected to the upper portion space 18 by means such as the orifice 62 through the panel 22 and the grille 28. Therefore, the pressure in the plenum chamber 60 remains very close to the pressure in the upper portion space 18.

There are some times when the pressure below the floor 16 needs to be relieved into the space 18. Therefore, optional flapper doors 64 may be provided which, in conjunction with mating holes 66 in the plates 40 and 42 enable a flow upward through the plates 40 and 42 as shown by the arrows 68 in FIG. 2. The doors 64 are lightly spring-loaded closed by means of springs 70 so that they normally remain in the closed flow obstructing condition shown in FIGS. 1, 3 and 4.

Figure 3:
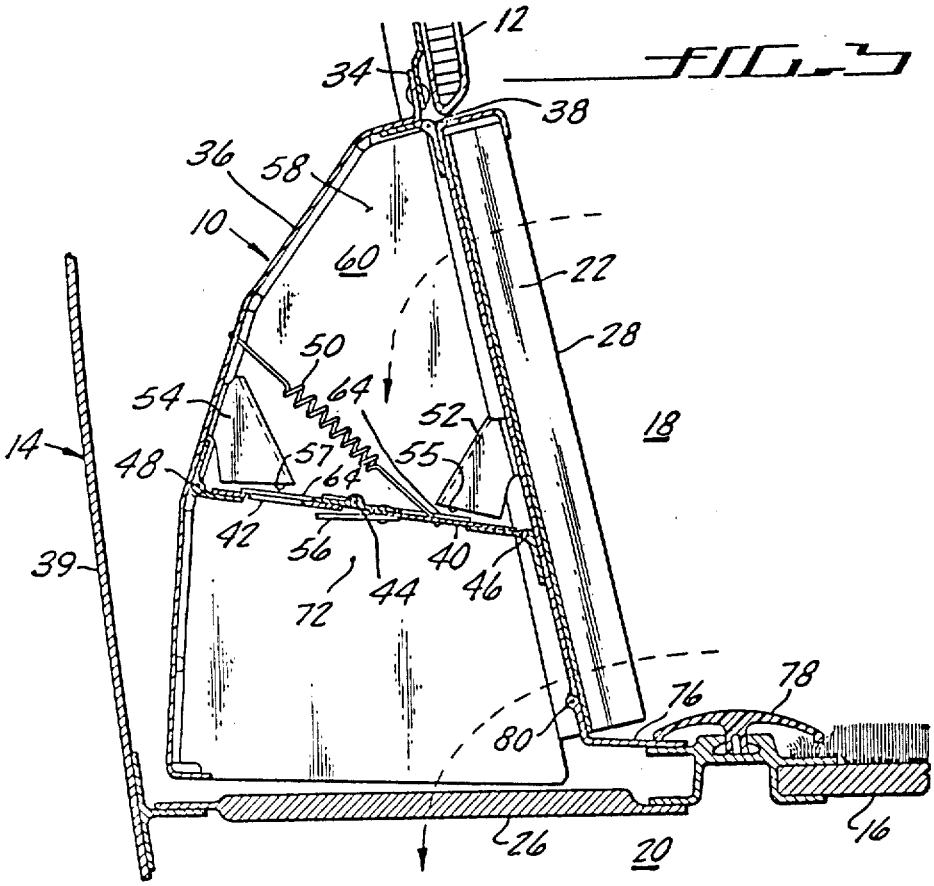
FIG. 3 is a view similar to FIG. 2 wherein a differential pressure of a predetermined value has been established across the floor structure of an aircraft and the vent structure is beginning to open a large vent area.
Figure 4:
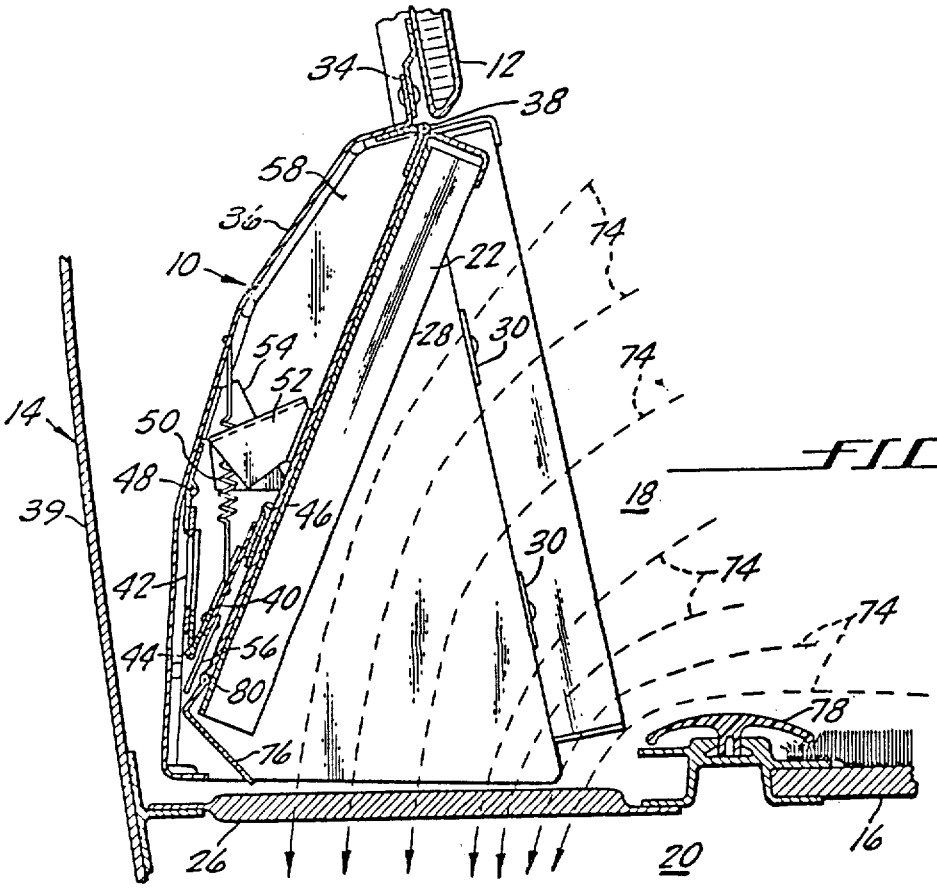
FIG. 4 is a view similar to FIGS. 2 and 3 wherein the vent panel has rotated out of the way to open a large vent area between the upper and lower portions of an aircraft fuselage to relieve pressure in the upper portion thereof.

When a differential pressure is established with the high pressure area above the floor 16, the differential pressure is also applied across the plates 40 and 42. As shown in FIG. 3, when the differential pressure reaches a predetermined amount to overcome the preload in the spring 50, the plates 40 and 42 start to rotate away from the stops whether they be stops 52 and 54 or stop 56. This movement eventually drives the plates beyond the overcenter, a location shown by the phantom hinge line 72 in FIG. 3. From this point on, the spring 50 causes further folding of the plates 40 and 42 which removes the structural bracing of the vent panel 22 pulling it toward the fuselage wall 39 to remove the flow restriction and allow a large flow of air indicated by the arrows 74 in FIG. 4. It should be noted that as the vent panel 22 moves toward the shell 36, a dust member 76 is pulled from under a resilient covering 78. The member 76 is required to prevent small fingers, hands, toys, fluids and, in addition, dust from undesirably falling beneath the floor 16. The member 76 can be connected to the vent panel by means of a hinge 80 so that it does not extend into the venting area to unnecessarily restrict the venting flow. The dust member 76 also restricts flow when the vent structure 10 is in its normal position so that the orifices 24 properly meter the flow of air conditioning, heating, and other desirable flows during normal operation of the aircraft. Alternately, a large cover member 78 could be used instead of the dust member 76. However, as the arrows 74 show, a large percentage of the flow is along the floor 16 and anything distrupting the flow in this area results in a disproportionate flow restriction when the vent structure 10 is open.

It should be noted that although the vent panel 22 is self actuating once the hinge 44 goes past the point 72, such need not be the case and in suitable circumstances the flow itself can push the panel 22 out of the way.

Once there is no longer need for emergency venting, the panel 22 can be moved from the position shown in FIG. [2] *4* back to the position shown in FIG. 2 by merely pulling it toward the passenger compartment until the two plates 40 and 42 snap into their proper overcenter position in readiness for the next emergency.

Thus, there has been shown and described a novel vent structure which is suitable for providing emergency venting between the upper and lower portions of an aircraft fuselage and which fulfills all of the objects and advantages sought therefor. Many changes, alterations, modifications, and other uses and applications of the subject vent structure will become apparent to those skilled in the art after considering this specification and the accompanying drawings. All such changes, alterations, uses and modifications which do not depart from the spirit and scope of the invention are deemed to be covered by the invention which is limited only by the claims which follow.

What is claimed is:

1. A vent for equalizing the pressure on opposite sides of a structure comprising:

a movable vent panel which in a first position restricts the flow from a first side of the structure to a second side thereof; and a plenum chamber pneumatically connected to the first side of the structure, said chamber having at least one movable wall having first and second sides, said first side of said movable wall being in pneumatic connection with the first side of the structure and said second side of said movable wall being in pneumatic connection with the second side of the structure so that differential pressure across the structure applies force to said wall, and bias means for urging said movable wall into a first position, said movable wall being operatively connected to said vent panel to maintain said movable vent panel in said first position thereof when said movable wall is in its first position whereby a predetermined differential pressure is capable of overpowering said bias means to move said movable wall to a position which allows said movable vent panel to move to a second position wherein flow from the first side of the structure to the second side is less restricted.

2. The vent defined in claim 1 including a second movable wall hingedly connected to the said [first] *at least one* movable wall which also forms a portion of said plenum chamber.

3. The vent defined in claim 2 including stop means which restrict the relative motion of said [first] *at least one movable wall* and *said* second movable walls toward said stop means until said [first] *at least one* movable wall is in its first position.

4. The vent defined in claim 3 wherein said bias means are connected to urge said [first] *at least one movable wall* and *said* second movable walls toward said stop means until said [first] *at least one* movable wall is moved a predetermined distance from said first position thereof, after which said bias means urge said [first] *at least one* movable wall away from said first position thereof to said position of said [first] *at least one* movable wall which allows said movable vent panel to move to said second position.

5. The vent defined in claim 4 wherein said vent panel forms a portion of said plenum chamber.

6. The vent defined in claim 5 including a vent housing having opposite side walls, said vent panel and said second movable wall being hingedly connected to said vent housing and said [first] *at least one* movable wall being hingedly connected to said vent panel so that said plenum chamber is bounded by at least a portion of said vent housing including said opposite side walls, said [first] *at least one movable wall* and *said* second movable walls and at least a portion of said vent panel.

7. The vent defined in claim 6 wherein said bias means includes a spring connected between said vent structure and said [first] *at least one* movable wall, said spring being predeterminately preloaded when said [first] *at least one* movable wall is in said first position.

8. The vent defined in claim 6 wherein said [first] *at least one* movable wall is hingedly connected to said vent panel at an intermediate location thereon, said vent panel including a passageway for allowing restricted flow between the opposite sides of the structure.

9. The vent defined in claim 6 wherein said vent panel forms a portion of the interior wall adjacent the cabin floor of a pressurizable aircraft, said vent panel including a dust cover hingedly connected thereto to prevent flow between the floor and said vent panel when said vent panel is in its first position.

10. The vent defined in claim 2 wherein at least one of said movable walls includes pneumatic check valve means which enable flow of air from the second side of the structure into said plenum chamber when said second side of the structure is at a higher [predetermine] *predetermined* pressure than said first.

11. The vent defined in claim 1 including linkage means hingedly connected to said [first] *at least one* movable wall to form an overcenter linkage therewith.

12. The vent defined in claim 11 including stop means which restrict relative motion between said [first] *at least one* movable wall and said linkage means to motion against said bias means when said [first] *at least one* movable wall is in its first position.

13. The vent defined in claim 12 wherein said stop means are mounted to said vent panel and include an abutment surface which engages said [first] *at least one* movable wall when said [first] *at least one* movable wall [portion] is in its first position.

14. The vent defined in claim 12 wherein said stop means include a plate connected to said [first] *at least one* movable wall which bears against said linkage means when said [first] *at least one* movable wall is in its first position.

15. A ventilation structure for relieving differential pressure across the passenger floor of an aircraft comprising:

a duct formed to duct air between the areas above and below the floor of the aircraft;

a grille, hingedly mounted to the aircraft which has first and second positions, the first position restricting the flow in the duct between the areas above and below the floor of the aircraft; and a plenum assembly positioned in said duct behind said grille, said plenum assembly having at least one movable wall having first and second sides, said first side of said movable wall being in pneumatic communication with the above floor area through said grille so that differential pressure across said floor applies force to said wall, and bias means for urging said movable wall into a first position, said movable wall being operatively connected to said grille to maintain said grille in said first position thereof when said movable wall is in its first position, when differential pressure is applied to said movable wall it moves allowing said grille to rotate to said second position opening said duct to less restricted flow.

16. The ventilation structure defined in claim 15 including a second movable wall hingedly connected to said [first] *at least one* movable wall and operatively connecting said [first] *at least one* movable wall to said grille.

17. The ventilation structure defined in claim 16 including stop means connected to one of said movable walls to restrict the hinge motion therebetween which would otherwise be caused by said bias means.

18. The ventilation structure defined in claim 17 wherein said bias means are connected to urge said [first] *at least one movable wall* and *said* second movable walls toward the angular relationship position restricted by said stop means until the differential pressure moves said first movable wall to a predetermined position different than said restricted position, after which said bias means urge said [first] *at least one* movable wall away from said restricted position thereof.

*19. A vent for equalizing the pressure on opposite sides of a structure, said vent comprising:*

*(a) a movable vent panel which in a first position restricts the flow from a first side of the structure to a second side thereof;*

*(b) a plenum chamber pneumatically connected to the first side of the structure, said plenum chamber having:*

*(i) a first movable wall having first and second sides, the first side of said first movable wall being in pneumatic connection with the first side of the structure and the second side of said first movable wall being in pneumatic connection with the second side of the structure so that differential pressure across the structure applies force to said first movable wall, and*

*(ii) a second movable wall hingedly connected to said first movable wall;*

*(c) bias means for urging said first movable wall into a first position;*

*(d) stop means which restrict the relative motion of said first and second movable walls under the urging of said bias means when said first movable wall is in its first position;*

*(e) said first movable wall being operatively connected to said movable vent panel to maintain said movable vent panel in its first position when said first movable wall is in its first position; and*

*(f) said bias means being connected to urge said first and second movable walls toward said stop means until said first movable wall is moved a predetermined distance from its first position, after which said bias means urges said first movable wall away from its first position to a second position which allows said movable vent panel to move to a second position wherein flow from the first side of the structure to the second side of the structure is less restricted,*

*whereby a predetermined differential pressure across the structure is capable of overpowering said bias means to move said first movable wall and said movable vent panel to their second positions.*

*20. A vent for equalizing the pressure on opposite sides of a structure, said vent comprising:*

*(a) a movable vent panel movable between a first position which restricts the flow from a first side of the structure to a second side thereof and a second position in which the flow from the first side of the structure to the second side thereof is less restricted;*

*(b) a plenum chamber pneumatically connected to the first side of the structure, said plenum chamber being partially defined by a first movable wall which has first and second sides and which is movable between first and second positions, the first side of said first movable wall being pneumatically connected to the first side of the structure and the second side of said first movable wall being pneumatically connected to the second side of the structure, whereby a differential pressure across the structure applies force to said first movable wall;*

*(c) bias means for urging said first movable wall into its first position;*

*(d) stop means which define the first position of said first movable wall;*

*(e) said first movable wall being operatively connected to said movable vent panel to maintain said movable vent panel in its first position when said first movable wall is in its first position and to move said movable vent panel to its second position when said first movable wall moves to its second position; and*

*(f) said bias means being connected to urge said first movable wall towards its first position until said first movable wall is moved a predetermined distance from its first position by a differential pressure across the structure, after which said bias means urges said first movable wall towards its second position,*

*whereby a predetermined differential pressure across the structure overpowers said bias means, move said first movable wall from its first position to its second position, and move said movable vent panel from its first position to its second position.*

*21. A vent as recited in claim 20 wherein said movable vent panel and said first movable wall are both rigid members.*

*22. A vent as recited in claim 21 wherein:*

*(a) said plenum chamber is partially defined by said movable vent panel;*

*(b) said movable vent panel pivots about a first hinge between its first and second positions;*

*(c) said first movable wall is connected to said movable vent panel by a second hinge; and*

*(d) said first movable wall pivots about said second hinge between its first and second positions.*

*23. A vent as recited in claim 22 wherein:*

*(a) said plenum chamber is partially defined by a second movable wall having first and second sides;*

*(b) said second movable wall is composed of a rigid member;*

*(c) said second movable wall is movable between first and second positions;*

*(d) said second movable wall is connected to said first movable wall by a third hinge;*

*(e) said second movable wall pivots about said third hinge between its first and second positions;*

*(f) the first side of said second movable wall is pneumatically connected to the first side of the structure, and the second side of said second movable wall is pneumatically connected to the second side of the structure, whereby a differential pressure across the structure applies force to said second movable wall;*

*(g) said stop means define the first position of said second movable wall; and*

*(h) said bias means are connected to urge said second movable wall towards its first position until said second movable wall is moved a predetermined distance from its first position by a differential pressure across the structure, after which said bias means urges said second movable wall towards its second position.*

*24. A vent for equalizing the pressure on opposite ends of a structure, said vent comprising:*

*(a) a movable vent panel which in a first position restricts the flow from a first side of the structure to a second side thereof;*

*(b) a plenum chamber pneumatically connected to the first side of the structure, said plenum chamber having:*

*(i) a first movable wall having first and second sides, the first side of said first movable wall being in pneumatic connection with the first side of the structure and the second side of said first movable*

*wall being in pneumatic connection with the second side of the structure so that differential pressure across the structure applies force to said first movable wall, and*

*(ii) a second movable wall hingedly connected to said first movable wall;*

*(c) bias means for urging said first movable wall into a first position;*

*(d) said first movable wall being operatively connected to said movable vent panel to maintain said movable vent panel in its first position when said first movable wall is in its first position; and*

*(e) at least one of said movable walls including pneumatic check valve means which enables flow of air from second side of the structure into said plenum chamber when said second side of the structure is at a higher predetermined pressure than said first,*

*whereby a predetermined differential pressure across the structure is capable of overpowering said bias means to move said first movable wall to a position which allows said movable vent panel to move to a second position wherein flow from the first side of the structure to the second side is less restricted.*

*25. A vent for equalizing the pressure on opposite sides of a structure, said vent comprising:*

*(a) a movable vent panel movable between a first position which restricts the flow from a first side of the structure to a second side thereof and a second position in which the flow from the first side of the structure to the second side thereof is less restricted;*

*(b) a plenum chamber pneumatically connected to the first side of the structure, said plenum chamber being partially defined by:*

*(i) a first rigid movable wall which has first and second sides and which is movable between first and second positions, the first side of said first movable wall being pneumatically connected to the first side of the structure and the second side of said first movable wall being pneumatically connected to the second side of the structure, whereby a differential pressure across the structure applies force to said first movable wall, and*

*(ii) a second rigid movable wall which has first and second sides and which is movable between first and second positions, the first side of said second movable wall being pneumatically connected to the first side of the structure and the second side of said second movable wall being pneumatically connected to the second side of the structure, whereby a differential pressure across the structure applies force to said second movable wall, said second movable wall being hingedly connected to said first movable wall;*

*(c) bias means for urging said movable walls into their first positions;*

*(d) said first movable wall being operatively connected to said movable vent panel to maintain said movable vent panel in its first position when said first movable wall is in its first position and to move said movable vent panel to its second position when said first movable wall moves to its second position; and*

*(e) at least one of said movable walls including check valve means which permit flow from the first side of the structure into said plenum chamber when the second side of the structure is at a higher pressure than the first side of the structure,* whereby a predetermined differential pressure across the structure overpowers said bias means, moves said movable walls from their first positions to their second positions, and moves said movable vent panel from its first position to its second position.

*26. A vent as recited in claim 25 wherein said movable vent panel is also a rigid member.*

*27. A vent as recited in claim 26 wherein:*

*(a) said plenum chamber is partially defined by said movable vent panel;*

*(b) said movable vent panel pivots about the first hinge between its first and second positions;*

*(c) said first movable wall is connected to said movable vent panel by a said second hinge; and*

*(d) said first movable wall pivots about said second hinge between its first and second positions.*

*28. A vent for equalizing the pressure on opposite sides of a structure, said vent comprising:*

*(a) a movable vent panel which in a first position restricts the flow from a first side of the structure to a second side thereof;*

*(b) a plenum chamber pneumatically connected to the first side of the structure, said plenum chamber having a first movable wall having first and second sides, the first side of said first movable wall being in pneumatic connection with the first side of the structure and the second side of said first movable wall being in pneumatic connection with the second side of the structure so that differential pressure across the structure applies force to said first movable wall;*

*(c) linkage means hingedly connected to said first movable wall to form an overcenter linkage therewith;*

*(d) bias means for urging said first movable wall into a first position;*

*(e) stop means which restrict relative motion between said first movable wall and said linkage means under the urging of said bias means when said first movable wall is in its first position, said stop means being mounted on said movable vent panel and including an abutment surface which engages said first movable wall when said first movable wall is in its first position; and*

*(f) said first movable wall being operatively connected to said movable vent panel to maintain said movable vent panel in its first position when said first movable wall is in its first position,*

*whereby a predetermined differential pressure is capable of overcoming said bias means to move said first movable wall to a position which allows said movable vent panel to move to a second position wherein flow from the first side of the structure to the second side is less restricted.*

*29. A vent for equalizing the pressure on opposite sides of a structure, said vent comprising:*

*(a) a movable vent panel movable between a first position which restricts the flow from a first side of the structure to a second side thereof and a second position in which the flow from the first side of the structure to the second side thereof is less restricted;*

*(b) a plenum chamber pneumatically connected to the first side of the structure, said plenum chamber being partially defined by a first movable wall which has first and second sides and which is movable between first and second positions, a first side of said first movable wall being pneumatically connected to the first side of the structure and the second side of said first movable wall being pneumatically connected to the second side of the structure, whereby a differential pressure across the structure applies force to said first movable wall;*

(c) linkage means hingedly connected to said first movable wall to form an overcenter linkage therewith;

(d) bias means for urging said first movable wall into its first position;

(e) stop means which define the first position of said first movable wall, said stop means being mounted on said movable vent panel and including an abutment surface which engages said first movable wall when said first movable wall is in its first position; and (f) said first movable wall being operatively connected to said movable vent panel to maintain said movable vent panel in its first position when said first movable wall is in its first position and to move said movable vent panel to its second position when said first movable wall moves to its second position, whereby a predetermined differential pressure across the structure overpowers said bias means, moves said first movable wall from its first position to its second position, and moves said movable vent panel from its first position to its second position.

30. A vent as recited in claim 29 wherein said movable vent panel and said first movable wall are both rigid members.

31. A vent as recited in claim 30 wherein:

(a) said plenum chamber is partially defined by said movable vent panel;

(b) said movable vent panel pivots about a first hinge between its first and second positions;

(c) said first movable wall is connected to said movable vent panel by a second hinge; and (d) said first movable wall pivots about said second hinge between its first and second positions.

32. A vent as recited in claim 31 wherein:

(a) said linkage means comprises a second movable wall;

(b) said second movable wall partially defines said plenum chamber;

(c) said second movable wall is composed of a rigid member which has first and second sides;

(d) said second movable wall is movable between first and second positions;

(e) said second movable wall is connected to said first movable wall by a third hinge;

(f) said second movable wall pivots about said third hinge between its first and second positions;

(g) the first side of said second movable wall is pneumatically connected to the first side of the structure, and the second side of said second movable wall is pneumatically connected to the second side of the structure, whereby differential pressure across the structure applies force to said second movable wall;

(h) said stop means define the first position of said second movable wall; and (i) said bias means are connected to urge said second movable wall toward its first position until said second movable wall is moved a predetermined distance from its first position by a differential pressure across the structure, after which said bias means urge said second movable wall towards its second position.

33. A vent for equalizing the pressure on opposite sides of a structure, said vent comprising:

(a) a movable vent panel which in a first position restricts the flow from a first side of the structure to a second side thereof;

(b) a plenum chamber pneumatically connected to the first side of the structure, said plenum chamber having a first movable wall having first and second sides, the first side of said first movable wall being in pneumatic connection with the first side of the structure and the second side of said first movable wall being in pneumatic connection with the second side of the structure so that differential pressure across the structure applies force to said first movable wall;

(c) linkage means hingedly connected to said first movable wall to form an overcenter linkage therewith;

(d) bias means for urging said first movable wall into a first position;

(e) stop means which restrict relative motion between said first movable wall and said linkage means under the urgings of said bias means when said first movable wall is in its first position, said stop means including a plate connected to said first movable wall which bears against said linkage means when said first movable wall is in its first position; and (f) first movable wall being operatively connected to said movable vent panel to maintain said movable vent panel in its first position when said first movable wall is in its first position, whereby a predetermined differential pressure is capable of overcoming said bias means to move said first movable wall to a position which allows said movable vent panel to move to a second position wherein flow from the first side of the structure to the second side is less restricted.

34. A vent for equalizing the pressure on opposite sides of a structure, said vent comprising:

(a) a movable vent panel movable between a first position which restricts the flow from a first side of the structure to a second side thereof and a second position in which the flow from the first side of the structure to the second side thereof is less restricted;

(b) a plenum chamber pneumatically connected to the first side of the structure, said plenum chamber being partially defined by a first movable wall which has first and second sides and which is movable between first and second positions, the first side of said first movable wall being pneumatically connected to the first side of the structure and the second side of said first movable wall being pneumatically connected to the second side of the structure, whereby a differential pressure across the structure applies force to said first movable wall;

(c) linkage means hingedly connected to said first movable wall to form an overcenter linkage therewith;

(d) bias means for urging said first movable wall into its first position;

(e) stop means which define the first position of said first movable wall, said stop means including a plate connected to said first movable wall which bears against said linkage means when said first movable wall is in its first position; and (f) said first movable wall being operatively connected to said movable vent panel to maintain said movable vent panel in its first position when said first movable wall is in its first position and to move said first movable vent panel to its second position when said first movable wall moves to its second position, whereby a predetermined differential pressure across the structure overpowers said bias means, moves said first movable wall from its first position to its second position, and moves said movable vent panel from its first position to its second position.

35. A vent as recited in claim 34 wherein said movable vent panel and said first movable wall are both rigid members.

36. A vent as recited in claim 35 wherein:

(a) said plenum chamber is partially defined by said movable vent panel;

(b) said movable vent panel pivots about a first hinge between its first and second positions;

(c) said first movable wall is connected to said movable vent panel by a second hinge; and (d) said first movable wall pivots about said second hinge between its first and second positions.

37. A vent as recited in claim 36 wherein:

(a) said linkage means comprises a second movable wall;

(b) said second movable wall partially defines said plenum chamber;

(c) said second movable wall is composed of a rigid member which has first and second sides;

(d) said second movable wall is movable between first and second positions;

(e) said second movable wall is connected to said first movable wall by a third hinge;

(f) said second movable wall pivots about said third hinge between its first and second positions;

(g) the first side of said second movable wall is pneumatically connected to the first side of the structure, and the second side of said second movable wall is pneumatically connected to the second side of the structure, whereby differential pressure across the structure applies force to said second movable wall;

(h) said stop means define the first position of said second movable wall; and (i) said bias means are connected to urge said second movable wall toward its first position until said second movable wall is moved a predetermined distance from its first position by a differential pressure across the structure, after which said bias means urge said second movable wall towards its second position.

38. A ventilation structure for relieving differential pressure across the passenger floor of an aircraft, said ventilation structure comprising:

(a) a duct formed to duct air between the areas above and below the floor of the aircraft;

(b) a grille hingedly mounted to the aircraft which has first and second positions, the first position restricting the flow in the duct between the areas above and below the floor of the aircraft;

(c) a plenum assembly positioned in said duct behind said grille, said plenum assembly having:

(i) a first movable wall having first and second sides, said first side of said first movable wall being in pneumatic communication with the above floor area through said grille so that differential pressure across said floor applies force to said first movable wall, and (ii) a second movable wall hingedly connected to said first movable wall and operatively connecting said first movable wall to said grille;

(d) bias means for urging said first movable wall into a first position;

(e) stop means connected to one of said movable walls to restrict the hinge motion therebetween which would otherwise be caused by said bias means;

(f) said first movable wall being operatively connected to said grille to maintain said grille in said first position thereof when said first movable wall is in its first position; and (g) said bias means being connected to urge said first and second movable walls towards the angular relationship position restricted by said stop means until the differential pressure moves said first movable wall to a predetermined position different than said restricted position, after which said bias means urge said first movable wall away from said restricted position thereof, whereby, when the differential pressure is applied to said movable wall, it moves, allowing said grille to rotate to said second position and opening said duct to less restricted flow.

39. A ventilation structure for relieving differential pressure across the passenger floor of an aircraft, said ventilation structure comprising:

(a) a duct formed to duct air between the areas above and below the passenger floor of the aircraft;

(b) a movable vent panel pivotably movable between a first position which restricts the flow in said duct between the areas above and below the passenger floor and a second position in which the flow in said duct between the areas above and below the passenger floor is less restricted;

(c) a plenum assembly positioned in said duct behind said movable vent panel, said plenum assembly comprising:

(i) a first movable wall which has first and second sides and which is movable between first and second positions, the first side of said first movable wall being pneumatically connected to the above floor area in the passenger aircraft and the second side of said movable wall being pneumatically connected to the below floor area in the passenger aircraft, whereby a differential pressure across the passenger floor applies force to said first movable wall, and (ii) a second movable wall which has first and second sides and which is movable between first and second positions, the first side of said second movable wall being pneumatically connected to the above floor area in the passenger aircraft and the second side of said second movable wall being pneumatically connected to the below floor area in the passenger aircraft, whereby a differential pressure across the passenger floor applies force to said second movable wall, said second movable wall being hingedly connected to said first movable wall;

(d) bias means for urging said movable walls into their first positions;

(e) stop means which define the first position of said first and second movable walls;

(f) said first movable wall being operatively connected to said movable vent panel to maintain said movable vent panel in its first position when said first movable wall is in its first position and to move said movable vent panel to its second position when said first movable walls moves to its second position; and (g) said bias means being connected to urge said first and second movable walls towards their first positions until said first and second movable walls are moved by predetermined distances from their first positions by a differential pressure across the passenger floor, after which said bias means urge said first and second movable walls towards their second positions, whereby a predetermined differential pressure across the passenger floor overpowers said bias means, moves said first and second movable walls from their first positions to their second positions, and moves said movable vent panel from its first position to its second position.

40. A ventilation structure as recited in claim 39 wherein said movable vent panel and said first and second movable walls are all rigid structures.

*41. A ventilation structure as recited in claim 40 wherein:*

*(a) said movable vent panel is part of said plenum assembly;*

*(b) said movable vent panel pivots about a first hinge between its first and second positions;*

*(c) said first movable wall is connected to said movable vent panel by a second hinge; and*

*(d) said first movable wall pivots about said second hinge between its first and second positions.*

*42. A ventilation structure as recited in claim 41 wherein:*

*(a) said second movable wall is connected to said first movable wall by a third hinge and*

*(b) said second movable wall pivots about said third hinge between its first and second positions.*

*43. A ventilation structure as recited in claim 39 wherein at least one of said movable walls includes pneumatic check valve means which permit air flow from the below floor area in the passenger aircraft to the above floor area when the below floor area is at a higher pressure than the above floor area.*

*44. A ventilation structure as recited in claim 39 wherein said stop means are mounted on said movable vent panel and include an abutment surface which engages said first movable wall when said first movable wall is in its first position.*

*45. A ventilation structure as recited in claim 39 wherein said stop means are connected to one of said movable walls to restrict the hinge motion therebetween which would otherwise be caused by said bias means.*

*46. A ventilation structure for relieving differential pressure across a floor in an aircraft which is divided into a first compartment and a second compartment by the floor, said ventilation structure comprising:*

*(a) a duct formed to duct air between the first and second compartments, said duct comprising a shell member;*

*(b) a movable vent panel pivotably mounted on said shell member, said movable vent panel being pivotably movable about a first hinge in both angular directions from a normal position in which the end of said movable vent panel remote from said shell member engages the floor, said movable vent panel having a first side in pneumatic communication with the first compartment and a second side in pneumatic communication with the second compartment, said movable vent panel allowing restricted flow of air between the first and second compartments when in the normal position;*

*(c) a first movable wall one end of which is pivotably mounted on a second hinge on the second side of said movable vent panel intermediate its ends, said first movable wall having a first side and a second side;*

*(d) a second movable wall one end of which is pivotably mounted on a third hinge on said shell member and the other end of which is pivotably connected via a fourth hinge to said first movable wall, said second movable wall having a first side and a second side;*

*(e) said shell member, said movable vent panel, and said first and second movable walls at least partly defining a plenum chamber, the first sides of said first and second movable walls facing said plenum chamber;*

*(f) said shell member, said movable vent panel, and said first and second movable walls being sized and shaped so that, when said movable vent panel is in its normal position, said fourth hinge is spaced from a straight line between said second and third hinges;*

*(g) said plenum chamber being pneumatically connected to the first compartment;*

*(h) the second sides of said first and second movable walls being pneumatically connected to the second compartment;*

*(i) bias means for urging said first and second movable walls to pivot in the direction the first sides of said first and second movable walls face when said movable vent panel is in its normal position;*

*(j) stop means which limit the movement of said first and second movable walls in the direction the first sides of said first and second movable walls face; and*

*(k) said first and second movable walls and said bias means together constituting an overcenter linkage connecting said movable vent panel to said shell member,*

*whereby:*

*(l) said overcenter linkage and said stop means normally maintain said movable vent panel in its normal position, but*

*(m) when a predetermined over pressure in the first compartment is communicated to said plenum chamber, said first and second movable walls pivot against the urging of said bias means about said second and third hinges, respectively, in the direction the second sides of said first and second movable walls face and said movable vent panel pivots in the direction the first side of said movable vent panel faces against the urging of said bias means about said first hinge until said fourth hinge passes the straight line between said second and third hinges, after which said bias means causes said first and second movable walls to continue to pivot in the direction the second sides of said first and second movable walls face about said second and third hinges, respectively, and said movable vent panel to pivot in the direction of the second side of said movable vent panel faces about said first hinge, permitting the over pressure in the first compartment to be vented to the second compartment through said duct.*

*47. Apparatus for venting pressurized air through a hollow wall of a pressurized compartment of an aircraft, comprising:*

*a mounting structure;*

*an apertured return air grille hinged to said mounting structure for swinging movement from a first position in which a light flow of return air passes through the grille to a second more open position in which a greatly increased flow of vent air can enter the hollow wall past the grille, and*

*means forming a plenum chamber behind said grille, said means including two swinging grille actuating plates forming a wall of said plenum chamber and hinges connecting said plates to the mounting structure and grille respectively at two spaced locations and to each other at an intermediate location, in a relation to swing said grille from said first position to said second position in response to a reduction in pressure at a downstream side of the plates;*

*there being a passage or passages through which said return air can discharge from said pressurized compartment at a location downstream of the grille, so that said light flow of return air follows a path first through the grille and then through said passage or passages into the interior of said hollow wall for discharge therefrom.*

48. Apparatus as recited in claim 47 and further comprising a vent panel located downstream of said grille, said passage or passages being formed in said vent panel.

49. Apparatus as recited in claim 47, in which said grille extends essentially vertically at said side of the compartment and is hinged at an upper edge thereof for swinging movement of a lower edge of the grille into said hollow wall.

50. Apparatus as recited in claim 47, in which said two swinging plates are in a slightly overcenter position when said grille is in said first position thereof.

51. Apparatus as recited in claim 47, in which said two swinging plates are in a slightly overcenter position when said grille is in said first position thereof, there being means yieldingly resisting relative swinging movement of said two grille actuating plates from said slightly overcenter position.

52. Apparatus as recited in claim 47, including means yieldingly urging said two swinging plates pivotally relative to one another in a direction tending to return said grille to said first position thereof when said grille is slightly displaced from its first position.

53. Apparatus as recited in claim 47, in which said means forming said plenum chamber include a hollow air confining structure mounted to the rear side of said grille to receive air therefrom and having an opening through which air discharges towards said swinging plates.

54. Apparatus as recited in claim 47, in which said means forming said plenum chamber include a hollow air confining structure mounted to a rear side of said grille and to which one of said plates is connected pivotally by one of said hinges.

55. Apparatus as recited in claim 47, in which said means forming said plenum chamber include a hollow air confining structure mounted to a rear side of said grille for swinging movement therewith and having an upper outlet opening through which air flows to said plates to act thereagainst.

56. Apparatus as recited in claim 47, in which said means forming said plenum chamber include a hollow air confining structure mounted to a rear side of said grille for swinging movement therewith and having an upper outlet opening through which air flows to said plates to act thereagainst, one of said hinges connecting one of said plates to said hollow air confining structure at a lower location, and the other of said hinges connecting the other of said plates to said mounting structure at a location spaced above said lower location.

57. Apparatus for venting pressurized air through a hollow side wall of a pressurized compartment of an aircraft, comprising:

a mounting structure;

an apertured return air grille at a side of the compartment;

first hinge means connecting said grille at an upper edge thereof to said mounting structure for swinging movement into said side wall of the compartment from a first generally vertically extending position of the grille in which a light flow of return air passes through the grille to a second more open position in which a greatly increased flow of vent air can enter the side wall past a lower edge of the grille;

two swinging grille actuating plates;

second and third hinge means connecting said two plates to said mounting structure and said grille respectively for relative swinging movement about spaced generally horizontal axes; and fourth hinge means pivotally connecting said two plates to one another at an intermediate location for relative swinging movement about a fourth axis in a relation to swing said grille from said first position thereof to said second position in response to a reduction in pressure at a downstream side of the plates;

said hinge means and plates being interconnected in a relation causing said fourth hinge means and its axis to pivot relative to said second and third hinge means and their axes upon swinging movement of said grille from said first position thereof to said second and more open position of the grille.

58. Apparatus as recited in claim 57, in which said two plates extend essentially horizontally in a slightly overcenter position when said grille is in said first position thereof.

59. Apparatus as recited in claim 57, including a hollow air confining plenum element connected to a rear side of said grille for swinging movement therewith and to which one of said hinge means is attached.

60. Apparatus as recited in claim 57, in which said mounting structure includes a frame disposed about said grille and relative to which the grille swings, and a downwardly and upwardly opening duct projecting rearwardly from the frame and into which said grille swings rearwardly and containing said plates and said second, third and fourth hinge means.

61. A vent for equalizing the pressure on opposite sides of a structure comprising:

a movable vent panel which in a first position restricts the flow from a first side of the structure to a second side thereof; and a plenum chamber pneumatically connected to the first side of the structure, said plenum chamber having a first movable wall having first and second sides, said first side of said first movable wall being in pneumatic connection with the first side of the structure and said second side of said first movable wall being in pneumatic connection with the second side of the structure so that differential pressure across the structure applies force to said first movable wall, and bias means for urging said first movable wall into a first position, said first movable wall being operatively connected to said movable vent panel to maintain said movable vent panel in said first position thereof when said first movable wall is in its first position, whereby a predetermined differential pressure is capable of overpowering said bias means to move said first movable wall to a position which allows said movable vent panel to move to a second position wherein flow from the first side of the structure to the second side is less restricted.

62. The vent defined in claim 61 including a second movable wall hingedly connected to said first movable wall, said second movable wall also forming a portion of said plenum chamber.

63. The vent defined in claim 62 including stop means which restrict the relative motion of said first and second movable walls under the urging of said bias means when said first movable wall is in its first position.

64. The vent defined in claim 63 wherein said bias means are connected to urge said first and second movable walls toward said stop means until said first movable wall is moved a predetermined distance from said first position thereof, afterward said bias means urge said first movable wall away from said first position thereof to said position of said first movable wall which allows said movable vent panel to move to said second position.

65. The vent defined in claim 64 wherein said movable vent panel forms a portion of said plenum chamber.

*66. The vent defined in claim 65 including a vent housing having opposite side walls, said movable vent panel and said second movable wall being hingedly connected to said vent housing and said first movable wall being hingedly connected to said movable vent panel so that said plenum chamber is bounded by at least a portion of said vent housing including said opposite side walls, said first and second movable walls, and at least a portion of said movable vent panel.*

*67. The vent defined in claim 66 wherein said bias means includes a spring connected between said vent structure and said first movable wall, said spring being preloaded by a predetermined amount when said first movable wall is in said first position.*

*68. The vent defined in claim 66 wherein said first movable wall is hingedly connected to said movable vent panel at an intermediate location thereon, said movable vent panel including a passageway for allowing restricted flow between the opposite sides of the structure.*

*69. The vent defined in claim 66 wherein said movable vent panel forms a portion of the interior wall adjacent the cabin floor of a pressurizable aircraft, said movable vent panel including a dust cover hingedly connected thereto to prevent flow between the floor and said movable vent panel when said movable vent panel is in its first position.*

*70. The vent defined in claim 62 wherein at least one of said movable walls includes pneumatic check valve means which enable flow of air from the second side of the structure into said plenum chamber when said second side of the structure is at a higher predetermined pressure than said first.*

*71. The vent defined in claim 61 including linkage means hingedly connected to said first movable wall to form an overcenter linkage therewith.*

*72. The vent defined in claim 71 including stop means which restrict relative motion between said first movable wall and said linkage means under the urging of said bias means when said first movable wall is in its first position.*

*73. The vent defined in claim 72 wherein said stop means are mounted on said movable vent panel and include an abutment surface which engages said first movable wall when said first movable wall is in its first position.*

*74. The vent defined in claim 72 wherein said stop means include a plate connected to said first movable wall which bears against said linkage when said first movable wall is in its first position.*

*75. A ventilation structure for relieving differential pressure across the passenger floor of an aircraft, said ventilation structure comprising:*

*a duct formed to duct air between the areas above and below the floor of the aircraft;*

*a grille hingedly mounted to the aircraft, said grille having first and second positions, the first position restricting the flow in the duct between the areas above and below the floor of the aircraft; and*

*a plenum assembly positioned in said duct behind said grille, said plenum assembly having a first movable wall having first and second sides, said first side of said first movable wall being in pneumatic communication with the above floor area through said grille so that differential pressure across said floor applies force to said first movable wall, and bias means for urging said first movable wall into a first position, said first movable wall being operatively connnected to said grille to maintain said grille in said first position thereof when said first movable wall is in its first position, and, when differential pressure is applied to said first movable wall, it moves, allowing said grille to rotate to said second position and opening said duct to less restricted flow.*

*76. The ventilation structure as defined in claim 75 including a second movable wall hingedly connected to said first movable wall and operatively connecting said first movable wall to said grille.*

*77. The ventilation structure defined in claim 76 including stop means connected to one of said movable walls to restrict the hinge motion therebetween which would otherwise be caused by said bias means.*

*78. The ventilation structure defined in claim 77 wherein said bias means are connected to urge said first and second movable walls toward the angular relationship position restricted by said stop means until the differential pressure moves said first movable wall to a predetermined position different than said restricted position, after which said bias means urge said first movable wall away from said restricted position thereof.*

*79. A pressure relief device in an airplane to provide decompression relief between a passenger compartment having a double side wall and a cargo compartment, the device comprising:*

*a grill;*

*ductwork to extend from an upper edge of the grill to an outer wall to form a channel for movement of air between the two compartments; and*

*a pivotally mounted valve to extend across to block the channel, said valve having resilient means sized for holding the valve closed under normal operating conditions and having perforations sized to allow pressure equalization across the closed valve in response to a low pressure differential and to require the valve to open in response to a high pressure differential.*

*80. A pressure relief device as in claim 79 further comprising:*

*the valve pivot axis located adjacent the ductwork, and the resilient means is a spring.*

*81. A pressure relief device for an airplane structure having a double wall passenger compartment and a cargo compartment, the device comprising:*

*a porous section of an interior wall of the passenger compartment;*

*a panel to extend from a top of the porous section towards an outer wall to form a duct leading to the cargo compartment;*

*a pivotally mounted valve to extend across to at least partially close the duct;*

*a spring to hold the valve closed in normal operation; and*

*means for permitting air flow through the valve at low pressure differential between the two compartments but to permit opening the valve in response to a sudden high pressure differential.*

*82. A pressure relief device as in claim 81 wherein the means for permitting air flow through the valve comprises having perforations through the valve.*

*83. A pressure relief device in an airplane to provide decompression relief between a passenger compartment having a double side wall and a cargo compartment comprising:*

*a perforated member forming a portion of an inside wall of the passenger compartment;*

*a panel to extend from a top of the perforated member toward an outer wall to form a duct behind the perforated member leading to the cargo compartment;*

*a valve pivotally mounted adjacent the panel to extend across to close off at least a portion of the duct;*

*a spring to hold the valve in the closed position; and*

*the valve having perforations sized to permit air flow between the two compartments through the closed valve in response to a low rate of differential pressure but not to prevent the valve opening in response to a sudden high pressure differential.*

*84. A method of providing side wall decompression relief between a passenger compartment and a cargo compartment of an airplane, the steps comprising:*

*positioning a perforated member in a lower sidewall section of an inside wall of the passenger compartment;*

*forming a duct behind the perforated member by extending a panel from the top of the perforated member toward an outside wall; and*

*at least partially closing off the duct with a spring closing pivotally mounted valve having perforations through the valve for permitting breathing through the valve under normal operating conditions and opening of the valve in response to a sudden pressure drop in the cargo compartment.*

* * * * *